United States Patent [19]
Wagner et al.

[11] 3,964,371
[45] June 22, 1976

[54] POWER BOOST STEERING MECHANISM

[75] Inventors: Heinrich Wagner, Schwabisch Gmund; Karl-Friedrich Karcher, Lorch, Wurtt.; Otto Merkle, Schwabish Gmund, all of Germany

[73] Assignee: Zahnradfabrik Friedrichshafen AG, Friedrichshafen, Germany

[22] Filed: May 29, 1975

[21] Appl. No.: 581,979

[52] U.S. Cl. ............................... 91/434; 180/147
[51] Int. Cl.² ..................... B62D 5/08; F15B 13/14
[58] Field of Search ............... 180/79.2 R; 91/434, 91/370, 371, 372, 373, 380

[56] References Cited
UNITED STATES PATENTS
2,880,586  4/1959  Lincoln ........................... 91/434 X
2,930,359  3/1960  MacDuff ...................... 180/79.2 R

*Primary Examiner*—M. H. Wood, Jr.
*Assistant Examiner*—John A. Pekar

[57] ABSTRACT

A construction for the valving and road resistance reaction chambers utilizing the lower end of the steering spindle supported at the lower end of the steering housing by only two thrust bearings and utilizing a minimum of seals. The construction accomplishes the purpose of reducing friction in the steering of vehicles, especially important for heavy, high speed vehicles. The construction further realizes the advantage of requiring a minimum of space and an assembly of simple parts particularly advantageous in trucks having a tilting driver cabin.

8 Claims, 2 Drawing Figures

POWER BOOST STEERING MECHANISM

Known prior art consists of U.S. Pat. No. 2,930,359 which patent, however, is not suitable for tilting cabin trucks requiring both mechanical and hydraulic resistance effects.

Another prior art patent U.S. Pat. No. 2,800,801 requires a multiplicity of four sealing rings or gaskets and three bearings in addition to the steering nut and threaded steering spindle for guidance and mounting. The construction is not suitable for high speed motor vehicles.

A further patent referred to herein merely to show the status of the art is U.S. Pat. No. 2,826,258.

None of the preceedingly mentioned patents captures the purpose of the invention disclosed herein because of the high frictional effects in comparison with the present invention which makes it suitable for high speed vehicles.

Briefly, the invention comprises a sleeve valve carried at the lower end of a steering housing which components have lands and grooves of a generally conventional nature coacting to form passages for flow control of the chambers of a double acting servomotor. In the case of the novel construction herein disclosed, the lower end of the steering spindle is accommodated within the sleeve valve and generally concentrically spaced therefrom, although concentricity of spacing is not critical. Such lower end of the steering spindle is secured to the sleeve valve by a thrust bearing abutting each end of the sleeve valve and accordingly the use of only two such bearings reduces friction. Further, the sleeve valve and housing are structured to form one of the reaction chambers, the sleeve valve being slidable in the housing but sealing being accomplished for that reaction chamber by only two seals bearing against relatively movable parts. Here again, friction is minimized by the use of merely two seals in the form of gaskets.

A detailed description of the invention now follows in conjunction with the appended drawing in which.

Figure 1:
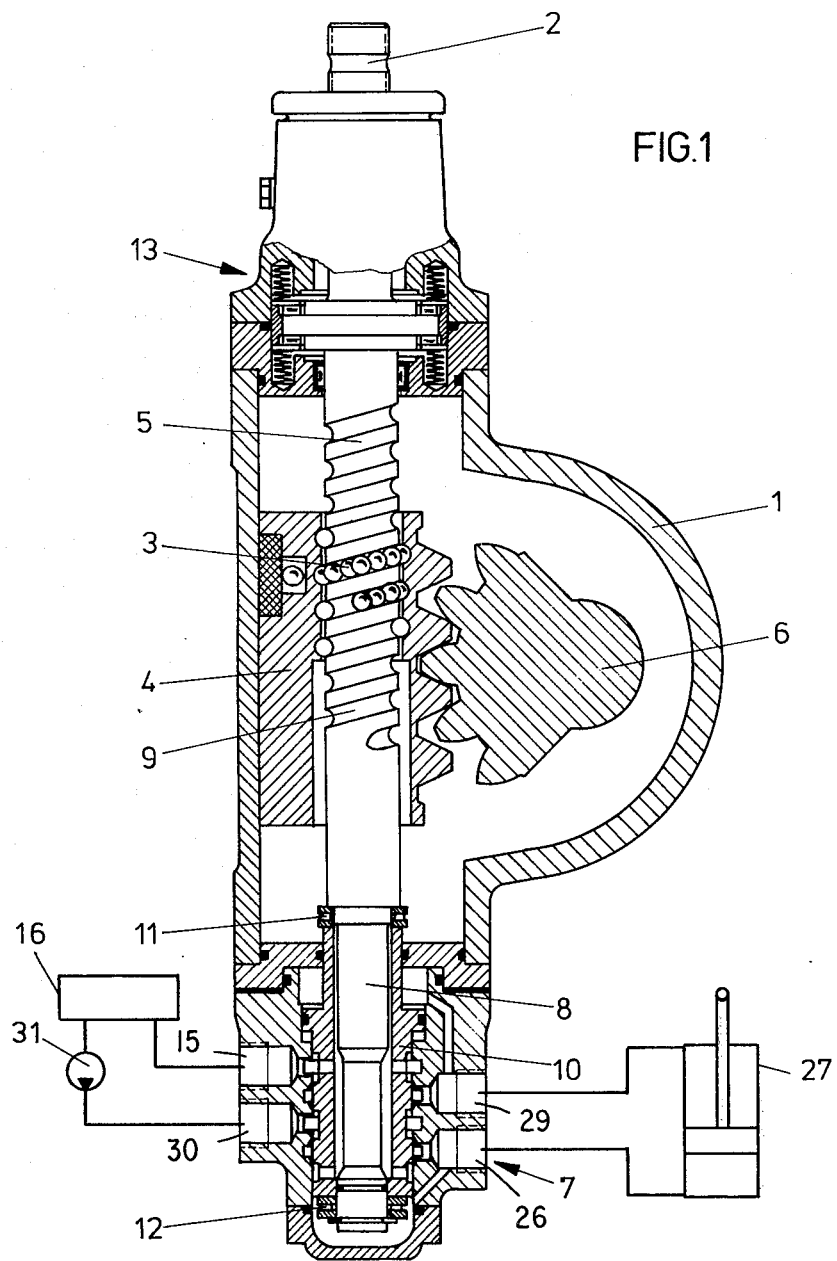
FIG. 1 is a longitudinal cross-section through a steering mechanism illustrating the essential components of the invention and their relationship to other components of a power boost steering system.
Figure 2:
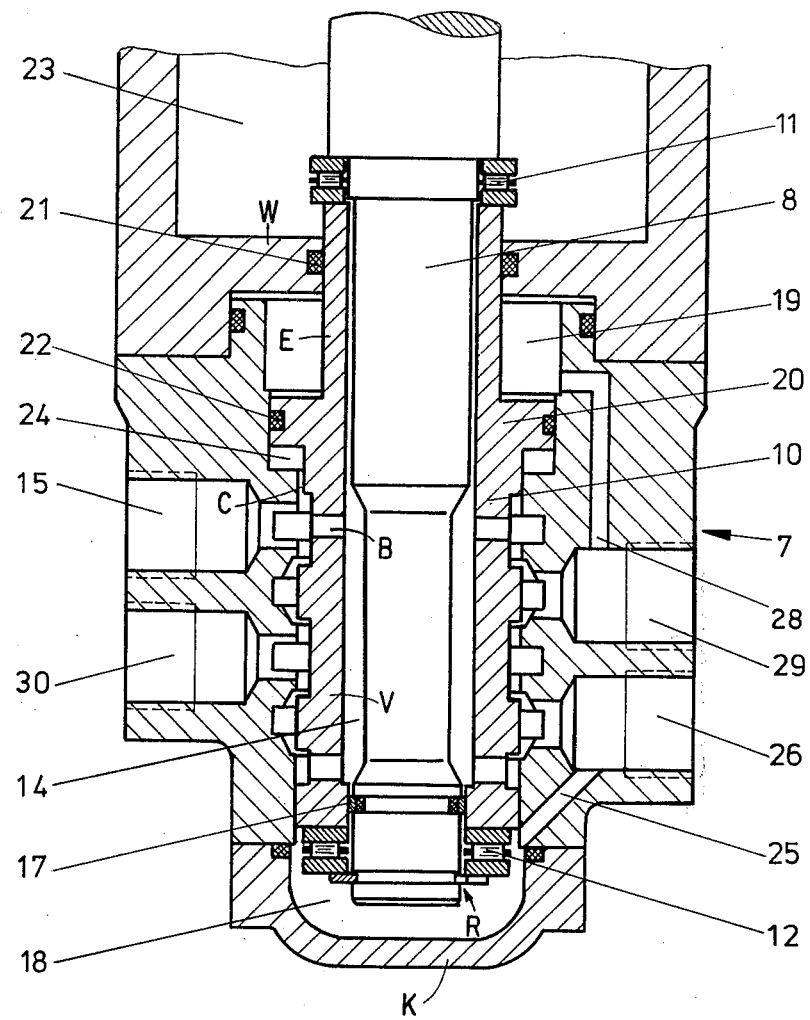
FIG. 2 is a magnified illustration of the lower end of the steering housing of FIG. 1.

Referring to the drawing, FIG. 1 shows a steering housing 1 through which extends a threaded steering spindle 5 having a threaded section 9 and conventional ball nut 4 coacting with the ball series 3. The steering spindle is slidably guided on one wall of the housing in the usual manner as shown to effect reversible rotation of the steering gear sector 6 understood to actuate a steering linkage (not shown).

A coupling 2 at one end of the steering spindle is provided for keying to a steering shaft (not shown) in the usual manner and the opposite end of the steering spindle is necked down at end 8 to extend spacedly within the interior wall of a control valve 7 which is comprised of a sleeve valve 10 understood to have lands and grooves coacting with lands and grooves of the lower housing section in the usual manner for the purpose of providing flow control passages.

Thus, reciprocation of the sleeve valve by means of the steering spindle in conjunction with a conventional spring assembly 13 for travel limit can effect flow control from pump 31 to the connection means 30 and thence via connection means 26 or 29 to either chamber of servomotor 27 with return via connection means 15 to sump 16.

In the specific construction, steering spindle end 8 is made smaller than the diameter of the base of the thread 9 on the steering spindle in order to minimize the diameter of the sleeve valve 10 and thus the entire control valve assembly 7 including the housing around the sleeve valve. Further, the end 8 need not be exactly concentric in the sleeve valve, compensation for misalignment being provided as will later appear. The spindle terminal, the lowest end portion, is in close proximity to the extreme end of the sleeve valve, as shown.

The steering spindle end 8 is axially fixed within and to the sleeve valve 10 by means of thrust bearings 11 and 12. Thus, bearing 11 is locked between the open end of the sleeve valve on a shoulder of the steering spindle while the lower end of the steering spindle is locked against the lower end of the sleeve valve as by a lock washer below bearing 12. However, in order to avoid any need for close tolerances and to compensate for any binding due to misalignment of the steering spindle and the sleeve valve, a resilent gasket 17 is carried in a groove at the lower end of the steering spindle. This gasket not only makes allowance for any radial play or misalignment, but also acts as a seal to prevent pressure leakage from a first reaction chamber 18. Such reaction chamber is formed by means of an end closure or cap K, understood to be suitably fastened over the otherwise open end of the housing and sleeve valve. Thus, pressure in chamber 18 can act axially against a first reaction piston R comprised of the radial end areas of the steering spindle and the sleeve valve for the purpose of providing a simulated road resistance. Such pressure is received by flow via a bore 25 connecting the chamber 18 with the housing connection means 26 to a servomotor chamber, gasket 17 being beyond the lands and grooves of the sleeve valve and housing to thus isolate chamber 18 from flow control passages effected by valve actuation.

At the opposite end of the land and groove sections of the housing and sleeve valve a second reaction piston 20 is formed as an enlarged shoulder radially extending integrally from extending collar E of the sleeve valve. Reaction piston 20 is slidable in an enlarged space 24 of the housing which with a transverse wall W forms a second reaction chamber 19, collar E protruding into the space 23 beyond wall W, which space houses the mechanical components of the device.

The second reaction chamber 19 is sealed by only two seals. Thus, the seal 21 is an internal groove of wall W and in sealing sliding relation with the extending collar E of the sleeve valve which is slidable in the aperture provided in the transverse wall W. Another seal 22 is carried in a peripheral groove of the reaction piston 20 and has sliding sealing relation in space 24 which has sufficient axial dimension for travel space for reaction piston 19.

It should be noted that the several spaces or spacings 14, 23 and 24 remain in communication with exhaust pressure at all times. Thus, spacing 14 can communicate via sleeve valve bore B, space 23 is open via bearing 11 to bore B, and space 24 has passage via channel C. Accordingly, any leakage from either reaction chamber will find its way back to the sump of the system.

It will be apparent from the construction that the shoulder which forms the second reaction piston 20 may be of such area as to have an effective pressure surface proportional to the working preasure surface of the servomotor piston in the servomotor chamber through which the piston rod passes. This compensates for the servomotor chamber volume which is somewhat less than the volume of the other servomotor chamber. Likewise, it will be apparent that the dimensioning of the end of the sleeve valve can be such as to render the effective reaction pressure surface proportional to the piston working pressure surface in the other chamber of the servomotor.

From the foregoing description the purpose of the invention will be seen to be met by the minimizing of bearings and seals so that a greatly reduced frictional resistance in movement of the steering spindle is achieved in comparison with prior art constructions. Further, the overall construction is very compact so as to make it feasible for the small space available in heavy high speed motor vehicles.

What is claimed is:

1. Booster steering apparatus comprising:
a housing (1) having a reciprocal sleeve valve (10) therein wherein said housing and sleeve valve have coacting flow control elements for selectively effecting passage of pressure and exhaust flow to actuate a servomotor;
said housing having pressure inlet connection means (30) and exhaust outlet connection means (15) and a connection means (26, 28) for each chamber of a double acting servomotor;
a steering spindle (5) in said housing having an end (8) within said sleeve valve;
means comprising a thrust bearing (11, 12) engaged with each end of said sleeve valve to axially secure said end of said steering spindle therein wherein a first reaction piston (R) comprised of the terminal end of said steering spindle and the respective end of said valve sleeve is effected to receive road reaction pressure;
closure means (K) for the end of said housing to effect a first reaction chamber (18) in which said first reaction piston is disposed;
a second reaction chamber (19) comprised of an enlarged space (23) in said housing surrounding said sleeve valve;
a second reaction piston (20) comprising a shoulder on said sleeve valve slidably engaged within said second reaction chamber;
said reaction chambers having connection to respective servomotor connection means (26, 29).

2. Booster steering apparatus as set forth in claim 1, said housing having a transverse wall (W) terminating said second reaction chamber and said sleeve valve passing slidably therethrough;
a gasket (21) slidably sealing said wall (W) around said sleeve valve and a gasket (22) sealing said second reaction piston in said second reaction chamber.

3. Booster steering apparatus as set forth in claim 1, said end of said steering spindle being spaced from the interior wall of said valve sleeve;
including a gasket in the spacing (14) intermediate said end of said steering spindle and the interior wall of said sleeve valve to seal said spacing against pressure in said first reaction chamber.

4. Booster steering apparatus as set forth in claim 1, wherein said shoulder on said sleeve valve effecting said second reaction piston is provided with a predetermined area so as to be proportional to the working pressure area of a respective servomotor chamber.

5. Booster steering apparatus as set forth in claim 1, said first reaction piston having an area proportional to the working pressure area of a respective servomotor chamber; and,
said shoulder on said sleeve valve effecting said second reaction piston having a predetermined area so as to be proportional to the working pressure area of a respective servomotor chamber.

6. Booster steering apparatus as set forth in claim 1, said housing having a transverse wall terminating said second reaction chamber and said sleeve valve passing slidably therethrough;
a gasket slidably sealing said wall around said sleeve valve and a gasket sealing said second reaction piston in sliding contact with the wall of said spacing;
said end of said steering spindle being generally radially spaced from the interior wall of said sleeve valve;
including a gasket in the spacing intermediate said steering spindle and the interior wall of said sleeve valve disposed beyond said coacting flow control elements to seal said first reaction chamber therefrom.

7. Booster steering apparatus as set forth in claim 1, said housing having a transverse wall terminating said second reaction chamber and said sleeve valve having an extending collar (E) passing slidably therethrough;
a gasket (21) slidably sealing said wall around said sleeve valve collar and a gasket (22) sealing said second reaction piston in sliding contact with the wall of said spacing;
said end of said steering spindle being generally radially spaced from the interior wall of said sleeve valve;
including a gasket in the radial spacing intermediate said end of said steering spindle and the interior wall of said sleeve valve disposed on said end of said steering spindle to seal said first reaction chamber;
said gasket being of resilient material so as to compensate for misalignment of said end of said spindle with said sleeve valve.

8. Booster steering apparatus as set forth in claim 1, a ball nut in said housing, said housing being configured to slidably guide and support said ball nut;
said steering spindle having a ball thread in said nut and said steering spindle having said ball nut and thrust bearings as the sole end support.

* * * * *